United States Patent [19]

Sano et al.

[11] 4,433,073

[45] Feb. 21, 1984

[54] OLEFINIC POLYMER COMPOSITION CONTAINING INORGANIC FILLER

[75] Inventors: Hironari Sano, Suzuka; Hiroshi Yui, Yokkaichi, both of Japan

[73] Assignee: Mitsubishi Petrochemical Company, Ltd., Tokyo, Japan

[21] Appl. No.: 282,734

[22] Filed: Jul. 13, 1981

[30] Foreign Application Priority Data

Jul. 17, 1980 [JP] Japan ................... 55-96825

[51] Int. Cl.³ .................... C08K 9/04; C08K 3/26; C08L 33/02
[52] U.S. Cl. .................... 523/201; 523/206; 524/518; 524/522; 524/524; 524/525; 524/526; 524/855; 524/856
[58] Field of Search ............ 260/42.14, 42.45, 42.46, 260/42.47, 42.53, 42.52, 42.56; 524/518, 525, 526, 522, 855, 856; 523/201, 206

[56] References Cited

U.S. PATENT DOCUMENTS

| 3,398,776 | 8/1968 | Reinbold | 524/525 |
|---|---|---|---|
| 3,470,127 | 9/1969 | Snell et al. | 524/525 |
| 3,478,132 | 11/1969 | Randolph | 524/525 |
| 3,658,752 | 4/1972 | Das et al. | 524/525 |
| 3,669,722 | 6/1972 | Bishop | 524/525 |
| 3,978,261 | 8/1976 | Ford et al. | 523/201 |
| 3,985,704 | 10/1976 | Jones et al. | 260/42.47 |
| 4,124,562 | 11/1978 | Yui et al. | 260/42.56 |
| 4,151,159 | 4/1979 | Geall et al. | 524/525 |
| 4,212,787 | 7/1980 | Matsuda et al. | 524/525 |
| 4,265,960 | 5/1981 | Arbit et al. | 260/42.14 |
| 4,278,576 | 7/1981 | Goldman | 260/42.14 |
| 4,307,009 | 12/1981 | Luders et al. | 260/42.14 |
| 4,311,628 | 1/1982 | Sabet et al. | 524/525 |
| 4,348,459 | 9/1982 | Drzal et al. | 524/525 |

FOREIGN PATENT DOCUMENTS 53-64256 6/1978 Japan .
53-64257 6/1978 Japan .

OTHER PUBLICATIONS

Derwent Abst. 57141 B/31, (J54078744), Sumitomo Chem.
Derwent Abst. 80166 B/44, (9/26/79), Idemitsu Kosan (J54124049).
Derwent Abst. 51642 B/28, (6/2/79), Idemitsu Indust. (J54068852).
Derwent Abst. 75845 C/43, (9/8/80), Asahi Dow (J55116743).

*Primary Examiner*—Paul Lieberman
*Assistant Examiner*—Herbert J. Lilling
*Attorney, Agent, or Firm*—Wenderoth, Lind & Ponack

[57] ABSTRACT

A high impact olefinic polymer composition comprising a continuous matrix of a thermoplastic olefinic polymer, a dispersed phase of an impact absorbing polymer or its composite dispersed in the matrix, and an inorganic filler having a smaller particle diameter than the dispersed phase and filled in said polymer or its composite constituting the dispersed phase.

11 Claims, 15 Drawing Figures

OLEFINIC POLYMER COMPOSITION CONTAINING INORGANIC FILLER

This invention relates to an olefinic polymer composition having markedly improved impact strength as a result of including an inorganic filler in a specified form.

More specifically, it pertains to an olefinic polymer composition containing an inorganic filler in a specified form, comprising a matrix (continuous phase) of a thermoplastic olefinic polymer and a dispersed phase of an impact-absorbing polymer or its composite (e.g., a composite of the impact-absorbing polymer and a crystalline olefinic polymer), the impact-absorbing polymer or its composite constituting the dispersed phase having filled therein an inorganic filler having a smaller particle diameter than the dispersed phase.

Thermoplastic olefinic polymers, especially low-density, medium-density or high-density polyethylene, isotactic polypropylene, a crystalline ethylene/propylene copolymer, or crystalline copolymers of a major proportion of ethylene and/or propylene with a minor proportion of other ethylenically unsaturated monomers (e.g., an ethylene/propylene/butene-1 copolymer, an ethylene/acrylic acid copolymer, or a maleic anhydride-grafted polypropylene) find extensive use in the fields of fishery, agriculture and food and as industrial materials in civil engineering, construction, chemical industry, automobile industry and electrical and mechanical engineering and as various household goods because of their various advantages. For example, they can be easily produced because excellent catalysts have been developed or the method of polymerization is simple. As a result of the development of various stabilizers of high performance and other additives, these polymers can meet various requirements such as heat resistance, weatherability, ultraviolet resistance and corrosion resistance. Furthermore, because of their excellent moldability in extrusion, injection, etc., various molded articles can be produced such as films, blow-molded bottles, sheets and articles of other configurations. Since different kinds of olefinic polymers have good compatibility with each other or the olefinic polymers also have good compatibility with other thermoplastic resins, they can be crosslinked or graft-modified with other unsaturated monomers. For this reason, they can be subjected to special types of molding such as expansion molding and co-extrusion lamination. The various molded articles prepared from these olefinic polymers have excellent heat-sealability, water resistance, chemical resistance, electrical insulation transparency, mechanical strength, feel appearance, secondary processability, packageability, and light weight.

Although the olefinic polymers are excellent materials when considered generally, their impact strength and rigidity are relatively poor and this often narrows the range of application of olefinic polymers.

To eliminate this defect, various attempts have been made to improve the impact strength and rigidity of olefinic polymers.

PRIOR ART

A usual method for improving the impact strength of an olefinic polymer is to blend the olefinic polymer with a polymer having rubbery properties. A specific procedure for the blending operation is either to add the polymer having rubber like properties to the olefin polymer, or to form the polymer having rubberlike properties by polymerization during the polymerization of an olefin.

The latter procedure has again wider acceptance because the degree of improvement of impact strength is greater and the operation for the production is less complex than in the former procedure. A specific example of the blending method by polymerization is a method which comprises first polymerizing propylene and then polymerizing ethylene and propylene to copolymerize the ethylene/propylene copolymer portion in block with the polypropylene portion (see, for example, Japanese Patent Publications Nos. 1836/1964, 16669/1969, 25434/1974 and 30264/1974, and Japanese Laid-Open Patent Publication No. 11529/1975).

On the other hand, a typical method for improving the rigidity of an olefin polymer, the other relatively poor property, is to incorporate various inorganic fillers in the olefinic polymer.

The technique of modifying the olefin polymers by incorporating inorganic fillers has recently been widely practiced because various modified properties such as good incinerability, fire retardancy, electric conductivity, printability, adhesiveness, coatability and changes in appearance can be imparted to olefinic polymers.

A popular example is to fill polypropylene or polyethylene with talc, calcium carbonate, magnesium hydroxide, carbon, titanium oxide, etc. It is true that if the inorganic filler is added in a great amount, the rigidity and other properties of the olefinic polymer will be improved gradually as the amount of the inorganic filler reaches a certain point. But on the other hand, its impact strength will be reduced, and a polymer containing a large amount of the filler is fragile.

In order to remedy this defect, there have been proposed a method for reducing the degree of decrease of impact strength incident to the filling of an inorganic filler by using the aforesaid ethylene/propylene copolymer having improved impact strength as the olefinic polymer; a method for improving impact strength by filling a propylene polymer with precipitated calcium carbonate having a specified particle diameter (average particle diameter of 0.16 to 1.0 micron) as an inorganic filler (Japanese Patent Application No. 28277/1979); or a method which comprises adding a polymer having rubbery properties further to an ethylene/propylene copolymer filled with an inorganic filler (Japanese Laid-Open Patent Publications Nos. 64256/1978 and 64257/1978).

Methods for improving the compatibility of an inorganic filler and an olefin polymer and the impact strength of polymer by using an inorganic filler whose surface is treated with a higher fatty acid, etc., or by blending an adhesive polymer having a polar group such as a carboxyl or glycidyl group (e.g., maleic anhydride-modified polypropylene, or an ethylene/vinyl acetate/glycidyl methacrylate copolymer) together with the inorganic filler and the olefin polymer (see Japanese Laid-Open Patent Publication No. 97947/1973 and 34937/1974).

In recent years, industrial component parts such as automotive parts or machine parts have been required to be lighter in weight and more flexible, and a great deal of interest has been aroused in replacing metallic portions by plastic materials. The plastic materials for such applications are more rigorously required to have impact strength, particularly at high temperatures, as well as rigidity. Thus, none of the materials obtained by the aforesaid conventional methods meet both of these requirements.

In view of such a state of art, it has been desired to develop an olefinic polymer composition filled with an inorganic filler which has high impact strength and high rigidity.

STARTING POINT OF THE INVENTION

The present inventors studied the mechanism of impact fracture of an olefin polymer by an electron microscopic observation technique developed by themselves (the details of this observation method technique will be described hereinbelow) in order to obtain an olefinic polymer composition containing a large amount of an inorganic filler which is not fragile and has a well-blended combination of high rigidity and impact strength. The present invention was has been accomplished on the basis of this study.

First, the mechanism of impact fracture of a composition obtained by filling an inorganic filler (e.g., calcium carbonate having an average particle diameter of 0.03 to 7 microns) in a matrix (continuous phase) of polypropylene was observed by the aforesaid technique. It was consequently found that minute cracks occur around the inorganic filler in the polypropylene upon the application of impact and grow into larger racks to cause fracture of the material (see FIG. 1); that when an inorganic filler having a small particle diameter is used, a number of minute cracks having smaller sizes are dispersed in the matrix without growing into larger cracks, and the composition absorbs a large amount of impact energy in the course of the formation of the many minute cracks dispersed in the polymer, and consequently, the impact strength of the composition generally becomes higher than in the case of using an inorganic filler having such a particle diameter as to give a small number of giant cracks.

When the structure of an ethylene/propylene obtained by blending a polymer having rubber-like properties by polymerization was observed by the aforesaid technique developed by the present inventors, it was found that crystalline polypropylene as a main component forms a matrix, and an ethylene/propylene copolymer rubber surrounds a dispersed phase of crystalline polyethylene dispersed in the matrix to form a composite structure (see FIG. 2); when impact is applied to this composition, cracks occur in the interface between the crystalline polyethylene forming the dispersed phase and the ethylene/propylene copolymer rubber (see FIG. 3); since the ethylene/propylene copolymer rubber exists between the cracks and the matrix, growth of the cracks is inhibited, and the impact energy is absorbed by the occurrence of the cracks and the deformation of the ethylene/propylene copolymer rubber to give high impact strength. The inorganic filler filled at random in the ethylene/propylene copolymer is dispersed in the matrix portion (see FIG. 4). When impact is applied to this composition, many cracks occur mainly in the matrix portion as in the case of the aforesaid inorganic filler-incorporated polypropylene, and a phenomenon of crack formation is scarcely noted in the dispersed phase which is a composite of polyethylene and the ethylene/propylene copolymer rubber. Thus, the favorable impact strength of the ethylene/propylene copolymer is not fully exhibited. Even when an inorganic filler treated with a higher fatty acid or a modified polymer having high affinity with the matrix component is used, the filler is likewise dispersed only in the matrix.

When the inorganic filler is dispersed only in the matrix, the impact strength, for example the Izod impact strength, of the composition is less than about half of that of an unfilled polymer composition when the average particle diameter of the inorganic filler is relatively large. On the other hand, when an inorganic filler having a moderately small particle size (for example, an average particle diameter of 0.15 to 0.5 micron) is incorporated into the matrix, the impact strength of the polymer increases over that of an unfilled polymer composition, but the increase is only about 20 to 30% at the highest.

As a result, the present inventors hit upon an idea that if an inorganic filler having a smaller particle diameter than the polyethylene portion (or the composite obtained by surrounding the polyethylene with the ethylene/propylene copolymer) in the dispersed phase of the ethylene/propylene copolymer mentioned above is filled not into the matrix but into the polyethylene portion (or the above composite) forming the dispersed phase, cracks which may occur in the polyethylene portion upon application of impact will be taken over by many fine cracks formed around the inorganic filler to reduce the impact, and growth of these cracks will not propagate to the matrix outside the surrounding ethylene/propylene copolymer rubber, whereby a resinous material having high impact strength will necessarily be obtained. On the basis of this idea, a number of experiments were conducted.

As one attempt to obtain a resin composition having an inorganic filler filled in a dispersed phase, the present inventors kneaded an ethylene/propylene copolymer, precipitated colloidal calcium carbonate having an average particle diameter of 0.3 micron and maleic anhydride-grafted polyethylene using a Brabender plastogram, and found that the inorganic filler was wonderfully filled in the dispersed phase (see FIG. 5). The impact strength of the resulting polymer composition was far greater than expected.

The present inventors have thus found that an olefinic polymer composition comprising a matrix of a thermoplastic olefinic polymer, a dispersed phase of an impact-absorbing polymer or its composite dispersed in the matrix, and an inorganic filler having a smaller particle diameter than the dispersed phase and being dispersed in the polymer or polymer composite constituting the dispersed phase has much higher impact strength, especially at low temperatures, then conventional products.

Since the composition of this invention has markedly increased impact strength while maintaining high rigidity, it contributes to wider applications of olefinic polymers to industrial component parts whose requirement for impact strength is rigorous, for example automotive parts (bumpers, instrument panels, etc.) and machine parts, and much is expected in commercializing the composition of the invention in these applications.

Now, the technique developed by the present inventors of examining the dispersed state of a dispersed phase in a polymeric composition and the relation between the dispersed state and the state of its impact fracture will be described.

A small fragment of the polymer composition obtained after cooling and solidification is carefully cut by using an ultramicrotome fitted with a glass knife or diamond knife at a low temperature of, say, $-70°$ C. to −100° C. to form a very flat surface. Then, to clarify its inner morphology, the cut surface is etched. Etching may be carried out by using an ion, a solvent, an acid, etc., but a suitable method of etching may be selected depending upon the type of the polymer and the type of the filler. Specifically, the ion etching method is suitable for ascertaining the presence of a matrix phase of the composition and a dispersed phase in the matrix. In this case, ionizing radiation is applied to the test piece for 5 to 20 minutes by performing discharging of 2,000 to 15,000 volts under reduced pressure. To examine the internal structure of the dispersed phase, etching by a solvent is suitable. For example, by etching the test specimen at 90° C. with xylene, the impact absorbing polymer constituting the dispersed phase is dissolved and removed. Examination of the resulting depressed portions leads to the determination of the state of existance of the impact-absorbing polymer. In order to examine the presence of the inorganic filler, the ion etching is applied to the test specimen and if desired, it is further etched with an acid (for example, etched with hydrofluoric acid or hydrochloric acid at room temperature).

Raised and depressed parts corresponding to the internal morphology are formed by the various methods of etching mentioned above, and gold is vacuum-deposited thereon. Observation of the thus treated raised and depressed parts can lead to determination of the morphology of the polymer composition.

POLYMER COMPONENTS USED IN THE INVENTION

Thermoplastic olefinic polymers which can be used as a matrix of the composition of this invention include homopolymers of α-olefins, copolymers of α-olefins, and α-olefins of a major proportion of at least one α-olefin with at least one other unsaturated monomer as a minor component.

The copolymers may be of any type such as block, random, and graft copolymers and composites of these.

Modification products, such as chlorinated or sulfonated products, of these olefinic polymers can also be used in this invention.

Examples of the α-olefin are ethylene, propylene, butene-1, pentene-1, hexene-1, heptene-1, and octene-1. Because of good availability, those having 2 to 8 carbon atoms are preferred. The α-olefin may also include aromatic unsaturated hydrocarbons such as styrene.

Examples of the unsaturated monomers include unsaturated organic acids, or the anhydrides esters or salts thereof, such as acrylic or methacrylic acid, methyl acrylate or methacrylate, maleic acid, and acrylonitrile; vinyl esters typified by vinyl acetate; unsaturated aromatic monomers such as styrene, α-methylstyrene and dimethylstyrene; and dienes such as butadiene, 1,2-butadiene, 1,4-or 1,5-hexadiene, and cyclopentadiene.

Suitable olefinic polymers forming the matrix are crystalline olefinic polymers such as a crystalline homopolymer of ethylene or propylene, or crystalline copolymers of a major proportion of ethylene or propylene with a minor proportion of another ethylenically unsaturated monomer.

Especially preferred olefinic polymers are low-density, medium density and high-density polyethylenes, polypropylene, an ethylene/propylene copolymer, maleic anhydride-grafted polyethylene or polypropylene, and an ethylene/vinyl acetate copolymer. Crystalline polypropylene is most preferred because of its marked effect of improving impact strength. In order to secure flowability during molding, these polymers preferably have a melt flow rate (MFR) of 0.005 to 50 g/10 minutes, especially 0.01 to 20 g/10 minutes. Preferred crystalline propylene polymers typified by crystalline polypropylene have an isotactic index, which represents the weight percent of an n-heptane-insoluble portion, of at least 70, especially at least 90, in view of rigidity, too.

Monoolefinic or diolefinic rubbery polymers or copolymers are preferred as the impact-absorbing polymer which constitutes the dispersed phase of the composition of this invention. Examples of such rubbery polymers or copolymers include an ethylene/propylene copolymer ribber, an ethylene/propylene/nonconjugated diene terpolymer, an ethylene/butene copolymer rubber, a styrene/conjugated diene copolymer, and polydiolefin rubbers. The ethylene/propylene copolymer rubber and ethylene/propylene/nonconjugated diene terpolymers are most preferred.

Generally, suitable rubbery polymers or copolymers have an initial modulus at room temperature of $10^6$ to $10^8$ dynes/cm$^2$.

An impact absorbing polymer composite may be used as the dispersed phase in this invention. Preferably, the composite consists of a crystalline olefinic polymer immiscible uniformly with the olefinic polymer constituting the matrix and a monolefinic or diolefinic rubber copolymer or copolymer surrounding the olefinic polymer, and is dispersed as a dispersed phase in the matrix of the composition.

The monolefinic or diolefinic rubbery polymer or copolymer as one component of the composite may be the various rubbery polymers or copolymers exemplified above as the impact absorbing polymer. Preferred species include an ethylene/propylene copolymer rubber, and ethylene/propylene/nonconjugated diene copolymer rubbers.

The other component of the impact absorbing polymer composite is a crystalline olefinic polymer which is not uniformly miscible with the olefinic polymer constituting the matrix. Any olefinic polymers which are not uniformly miscible with the matrix-forming olefinic polymer may be used for this purpose. Examples include homopolymers of copolymers of α-olefins such as ethylene, propylene, butene-1 and hexane-1, and copolymers of a major proportion of an α-olefin and a minor proportion of another unsaturated monomer. Any olefinic polymers which are exemplified above as the matrix and are crystalline can be used. Specific examples of preferred polymers are crystalline polyethylene, crystalline polypropylene, and a crystalline ethylene/propylene copolymer.

It is essential that the crystalline olefinic polymer constituting the impact absorbing polymer composite should be not miscible uniformly with the matrix. Thus, once the matrix polymer has been determined, a crystalline olefinic polymer not miscible uniformly with the matrix polymer can be selected properly from those exemplified hereinabove.

Generally, the matrix polymer is different in kind from the crystalline olefinic polymer used as one component of the impact absorbing polymer composite, but this is not always necessary. Even when olefinic polymers of the same kind are used, thier properties such as the degree of polymerization, molecular weight and compatibility may be changed by using different manufacturing conditions or treating one of the polymers so that they are not uniformly miscible with each other.

Some preferred combinations of the matrix phase and the dispersed phase, i.e. the impact absorbing polymer or its composite, are shown below.

| Matrix phase | Dispersed phase |
| --- | --- |
| (1) Crystalline polypropylene | Ethylene/propylene copolymer rubber |
| (2) " | Crystalline ethylene polymer surrounded by an ethylene/propylene copolymer |
| (3) " | Crystalline ethylene polymer surrounded by an ethylene/butene copolymer |
| (4) " | Crystalline ethylene/propylene copolymer surrounded by an ethylene/propylene copolymer |
| (5) Crystalline ethylene polymer | Ethylene/propylene copolymer |
| (6) Crystalline ethylene polymer | Crystalline propylene polymer surrounded by an ethylene/propylene copolymer rubber |
| (7) Crystalline ethylene/propylene copolymer | Ethylene/propylene copolymer |
| (8) Crystalline ethylene/propylene copolymer | Crystalline ethylene polymer surrounded by an ethylene/propylene copolymer rubber |

OTHER COMPONENTS IN THE COMPOSITION OF THIS INVENTION

In the composition of this invention, the dispersed phase is preferably distributed finely and uniformly in the matrix phase. When the matrix olefin polymer is to be mechanically blended with the impact absorbing polymer or its composite as the dispersed phase, such a uniformly dispersed system can be formed by properly selecting the types of these polymers (the molecular weight, the molecular weight distribution, the copolymerization ratio, the degree of randomness, etc. should also be taken into consideration), the blending conditions (the apparatus, the temperature, the kneading speed, the time, etc.), etc. One preferred embodiment of preparing the uniformly dispersed system involves forming the dispersed phase simultaneously during the course of producing the matrix olefinic polymer. For example, a composition consisting of a matrix of polypropylene and dispersed therein a dispersed phase of crystalline polyethylene surrounded by an ethylene/propylene copolymer rubber can be formed by polymerizing propylene in the presence of a Ziegler catalyst and then copolymerizing propylene and ethylene.

Generally, the particle diameter of the dispersed phase in the matrix phase is preferably 0.05 to 50 microns, especially preferably 0.1 to 10 microns.

The inorganic filler which can be used in this invention must at least meet the following two requirements.

(1) It should have the properly of getting into the impact absorbing polymer or its composite constituting the dispersed phase. Generally, therefore, inorganic fillers having higher affinity for the impact absorbing polymer or composite constituting the dispersed phase than for the matrix olefinic polymer are preferably used in the invention. When the inorganic filler itself does not have the above property, such a property should be imparted by treating or coating it with another component.

In other words, the inorganic filler should have higher affinity for at least one component polymer in the impact absorbing polymer or its composite constituting the dispersed phase than for the olefinic polymer constituting the matrix either by itself or as a result of being treated or coated with another component.

(2) The inorganic filler should have a smaller size (average particle diameter) than the dispersed phase.

It is important that in the composition of this invention, the inorganic filler should be present in the impact absorbing polymer or its composite constituting the dispersed phase. This is the very reason why the composition of the invention has high impact strength and rigidity.

Accordingly, for introducing the inorganic filler into the dispersed phase, it is desirable to first examine the size of the dispersed phase in the matrix by the aforesaid morphological analysis of the matrix phase and the dispersed phase by an electron microscope and to select the inorganic filler of a preferred particle diameter on the basis of the result of the morphological analysis.

Usually, inorganic fillers having a smaller particle diameter than the dispersed phase are selected. An inorganic filler having a slightly larger particle diameter than the dispersed phase may also be used in this invention because in the course of kneading the filler and the dispersed phase, the polymer constituting the dispersed phase covers the inorganic filler, and consequently, the inorganic filler is surrounded by the dispersed state in the final composition.

The particle diameter of the inorganic filler is determined relative to the size of the dispersed phase.

Generally, average particle diameters of less than 2 microns, preferably not more than 1.5 microns, especially preferably not more than 1 micron, are suitable for obtaining high impact strength.

Inorganic fillers having an average particle diameter of 0.05 to 1 micron, above all 0.15 to 0.5 micron, are preferred. The average particle diameter as referred to herein denotes the average diameter of primary particles which is measured by observation with an electron microscope. The inorganic filler may be in the form of granuless (spherical, cubic, etc.), needles, plates, fibers, etc. The granular form is preferred.

Such inorganic fillers are, for example, metal atoms of Groups I to VIII of the periodic table (e.g., Fe, Na, K, Cu, Mg, Ca, Zn, Ba, Al, Ti) and silicon, and the oxides, hydroxides, carbonates, sulfates, silicates and sulfites of these metallic elements, and various clay minerals in which some of these compounds are present. Specific examples include iron oxide, zinc oxide, titanium oxide, alumina, silica, aluminum hydroxide, magnesium hydroxide, calcium hydroxide, magnesium carbonate, calcium carbonate (heavy, light, colloidal), barium sulfate, calcium sulfate, sodium sulfate, calcium sulfite, calcium silicate, clay, wollastonite, glass beads, glass powders, silica sand, silica rock, quartz powder, volcanic pumice, diatomaceous earth, white carbon, iron powder and aluminum powder. These fillers may be used as a mixture of two or more.

Precipitated calcium carbonate and silica having an average particle diameter of 0.05 to 1.0 micron are especially preferred because they are granular.

These inorganic fillers may be used as such or after treatment with a surface-modifying agent. Examples of the surface-modifying agent are higher fatty acids or their derivatives such as esters and salts (e.g., stearic acid, oleic acid, palmitic acid, calcium stearate, magnesium stearate, aluminum stearate, stearamide, ethyl stearate, methyl stearate, calcium oleate, oleinamide, ethyl oleate, calcium palmitate, palmitamide, and ethyl palmitate), silane coupling agents (e.g., vinyltrimethoxysilane, vinyltriethoxysilane, vinyltriacetoxysilane, γ-chloropropyltrimethoxysilane, γ-aminopropyltrimethoxysilane, and γ-methacryloxypropyltrimethoxysilane), and titanium coupling agents (e.g., isopropyltriisostearoyl titanate, isopropyltrilaurylmyristyl titanate, isopropyl-isostearoyldimethacryl titanate, and isopropyltridiisooctyl phosphoate titanate).

Another preferred method for modifying the surface of the inorganic filler is a mechanochemical method which comprises pulverizing the inorganic filler in the presence of an unsaturated organic acid or its ester (e.g., acrylic acid, methacrylic acid, methyl acrylic acid, methyl methacrylate, ethyl acrylate, etc.) or a polymer derived therefrom to adhere the polymer to the surface of the inorganic filler.

In addition to these essential components, the composition of this invention may further include a reactive derivative of the impact absorbing polymer as a component constituting the dispersed phase of the composition or a reactive derivative of the crystalline olefinic polymer. Such a reactive derivative is a carrier component for drawing the inorganic filler into the impact absorbing polymer or its composite.

As the specific examples in the foregoing description show, these reactive derivatives may by themselves have the properties of the impact absorbing polymer or the crystalline olefinic polymer in the polymer composite, and these reactive derivatives functioning as a carrier component may be used as the impact absorbing polymer or the crystalline olefinic polymer component of the polymer composite. However, since these derivatives are generally expensive, it is advantageous to use them in small amounts as a pure carrier component.

Examples of the reactive derivatives of the impact absorbing polymer include products obtained by grafting unsaturated organic acids or the anhydrides thereof (e.g., acrylic acid, methacrylic acid, maleic acid, itaconic acid, or the anhydrides thereof) or unsaturated organic silane compounds (e.g., compounds of the following formula (1) such as vinyltrimethoxysilane, vinyltriethoxysilane, vinyltriacetoxysilane, γ-methacryloxypropyltrimethoxysilane, and propenyltrimethoxysilane)

$$RSiR'_nY_{3-n} \quad (1)$$

wherein R represents an ethylenically unsaturated hydrocarbyl or hydrocarbyloxy group, R' represents an aliphatic saturated hydrocarbnyl group, Y represents a hydrolyzable organic group, and n represents 0, 1 or 3, provided that two or more Y groups may not be the same,
to ethylenic copolymer rubbers such as an ethylene/propylene copolymer rubber, an ethylene/propylene/nonconjugated diene copolymer rubber or an ethylene-butene copolymer rubber, a styrene-conjugated diene copolymer rubber such as styrene/butadiene copolymer, a polydiolefin rubber such as polybutadiene, or a monolefinic or diolefinic rubbery polymer or copolymer; and ionomers obtained by ionizing with metals at least one carboxyl group attached to the grafted chain of the above rubbery polymers or copolymers graft-modified with the unsaturated organic acids or the acid anhydrides thereof.

The aforesaid rubbery polymers or copolymers into which hydrophilic groups have been introduced by techniques of graft, block or random copolymerization, a substitution reaction, oxidation, etc. can all be used as the reactive derivative of the impact absorbing polymer in addition to the specifically exemplified compounds given above.

The reactive derivative of the crystalline olefinic polymer may have affinity for both of the inorganic filler and the crystalline olefinic polymer as one component constituting the dispersed phase present in the continuous matrix phase of the composition of this invention. When the composition of this invention is prepared by using this reactive derivative, it positively acts to draw the inorganic filler into the crystalline olefinic polymer.

Examples of the reactive derivative of the crystalline olefinic polymer include products obtained by grafting the same unsaturated organic acids or the acid anhydrides thereof or the unsaturated organic silanes as exemplified above with regard to the reactive derivative of the impact absorbing polymer, and ionomers obtained by ionizing with metals at least one carboxyl group attached to the grafted chain of the above grafted crystalline olefinic polymers.

In addition to these specific examples, all crystalline olefinic polymers into which hydrophilic groups have been introduced by techniques of graft, block and random copolymerizations, a substitution reaction, an oxidation reaction, etc. can be used as the reactive derivatives of the crystalline olefinic polymer.

Examples of other components which can be added to the composition of this invention include thermoplastic resins other than the olefinic polymers [e.g., polyamides, polyethylene terephthalate, polystyrene, polyvinyl chloride, thermoplastic polyesters, polyacrylonitrile, poly(methyl methacrylate), polyvinyl alcohol, etc.], various stabilizers such as anitoxidants, ultraviolet absorbers, weatherability improvers, thermal degradation inhibitors, corrosion inhibitors and copper damage inhibitors, fire retardants, coloring agents, antistatic agents, lubricants, and other additives (e.g., neutralizing agents, blowing agents, dispersing agents, antifoamers, etc.).

The proportions of the various components of the composition of the invention described above are as follows:

The proportion of the thermoplastic olefinic polymer constituting the matrix is 30 to 98.5% by weight, preferably 40 to 80% by weight, based on the entire composition.

The proportion of the polymer component (excluding the inorganic filler) forming the dispersed phase is 0.5 to 69% by weight, preferably 10 to 40% by weight, based on the entire composition.

When the polymer component forming the dispersed phase is an impact absorbing polymer composite, the amount of the crystalline olefinic polymer as one component of the polymer composite is 5 to 98.5% by weight, preferably 20 to 85% by weight, based on the composite. The proportion of the impact absorbing polymer as the other component of the polymer composite is 1.5 to 95% by weight, preferably 15 to 80% by weight, based on the composite.

Preferably, the composition of this invention contains 1 to 60% by weight, especially 3 to 45% by weight, of the inorganic filler based on the entire composition.

The proportion of the reactive derivative of the impact absorbing polymer which can be added optionally to the composition of the invention is 0.5 to 69% by weight, especially 10 to 40% by weight, based on the entire composition. The amount of the reactive derivative of the crystalline olefinic polymer is 5 to 98.5% by weight, especially 20 to 85% by weight, based on the impact absorbing polymer composition.

The other thermoplastic resins which can be optionally added to the composition of this invention are used in an amount of not more than 30% by weight, especially not more than 10% by weight, in view of their compatibility with the composition of the invention. The various stabilizers and other additives may be used in amounts which are generally added to synthetic resins.

PROCESS OF THE INVENTION

The composition of this invention can be prepared, for example, by a method comprising kneading the above components by means of a mixing device such as a single screw extruder, a twin screw extruder, a Banbury mixer, a roll or a Brabender plastogram and cooling and solidifying the mixture; a solution mixing method comprising adding the above components to suitable solvents such as hydrocarbons or their derivatives (e.g., hexane, heptane, benzene, toluene, xylene, dichlorobenzene and trichlorobenzene), and mixing soluble components with each other or a soluble component with an insoluble component either in solution or in suspension; a polymerization method comprising simultaneously forming the dispersed phase component and other components at the time of producing the matrix polymer by polymerization; or a combination of these methods. The above polymerization is preferred.

According to the present invention, there can be produced a high impact olefinic polymer composition having a continuous matrix of a thermoplastic olefinic polymer and a dispersed phase of an impact absorbing polymer or its composite dispersed in the matrix with the polymer or polymer composite constituting the dispersed phase being filled with an inorganic filler having a smaller particle diameter than the dispersed phase can be produced by a process which comprises

[I] (1) polymerizing at least one olefinic monomer to form at least a part of a thermoplastic polymer constituting the matrix phase and thereafter (2) polymerizing at least one monolefin, diolefin and/or other unsaturated monomer different from the olefinic monomer used in step (1) in the presence or absence of the olefinic monomer used in step (1) so as to form at least one of (A) a crystalline olefinic polymer which cannot be mixed uniformly with the olefinic polymer constituting the matrix, (B) a reactive derivative of the polymer (A) which has affinity for both the crystalline olefinic polymer (A) and (C) an inorganic filler having a suitable particle size, (D) an impact absorbing polymer, (E) a reactive derivative of the polymer (D) which has affinity for both the polymer (D) and the inorganic filler (C) and (F) a composite of the polymer (D) and the crystalline olefinic polymer (A), or first performing step (2) of polymerizing the unsaturated monomer so as to form at least one of (A), (B), (D), (E) and (F) and then performing step (1) of polymerizing the olefinic monomer in the presence or absence of the unsaturated monomer to form the matrix polymer, thereby forming an olefinic polymer composition consisting of the matrix (continuous phase) of the thermoplastic olefinic polymer and the dispersed phase of at least one of components (A), (B), (D), (E) and (F) dispersed in the matrix; and

[II] thereafter mixing the composition with the inorganic filler (C) and if required, at least one of components (A), (B), (D), (E) and (F) in any desired sequence.

In [I] of the above process, it is advantageous to first perform step (1) of polymerizing the olefinic monomer to produce the matrix polymer and then to perform step (2) of polymerizing the monolefin, diolefin and/or other unsaturated monomer for forming the dispersed phase preferably in the presence of the olefinic monomer used in step (1).

In a preferred embodiment, the process for producing the composition of this invention comprises

[I] (1) polymerizing at least one olefinic monomer to form at least a part of a thermoplastic polymer constituting a matrix and thereafter (2) polymerizing at least one monolein and/or diolefin different from the above olefinic monomer in the presence or absence of the olefinic monomer used in step (1) to form an impact absorbing polymer or polymer composite, or first performing step (2) of polymerizing at least one monolefin and/or diolefin to form the impact absorbing polymer or its composite and then performing step (1) of polymerizing the olefinic monomer for constituting the matrix phase in the presence or absence of such an olefin and/or diolefin, thereby forming an olefinic polymer composition consisting of the matrix (continuous phase) of the thermoplastic olefinic polymer and a dispersed phase of the impact absorbing polymer or polymer composite dispersed in the matrix; and

[II] thereafter mixing the composition with (C) an inorganic filler having a suitable particle diameter either alone or together with (B) a reactive derivative of the crystalline olefinic polymer which has affinity for both the inorganic filler and the crystalline olefinic polymer constituting at least a part of the dispersed phase and/or (E) a reactive derivative of the impact absorbing polymer which has affinity for both the inorganic filler and the impact absorbing polymer forming at least a part of the dispersed phase, in any desired sequence.

There is no restriction on the order of mixing the aforesaid components, and they may be mixed in any sequence.

Table A below summarizes some basic combinations of the components to be mixed. The symbol O indicates that the components so marked are used. In cases 1 to 9, the dispersed phase consists of an impact absorbing polymer composite.

TABLE A

| | | Components of the dispersed phase | | | | |
|---|---|---|---|---|---|---|
| Case | Matrix polymer | (a) Rubbery polymer | (b) Crystalline olefin polymer | Derivative of (a) | Derivative of (b) | Inorganic filler |
| 1 | O | O | O | | | O |
| 2 | O | O | O | | O | O |
| 3 | O | O | O | O | | O |
| 4 | O | | O | O | | O |
| 5 | O | O | | | O | O |
| 6 | O | | | O | O | O |
| 7 | O | O | | O | O | O |

TABLE A-continued

| Case | Matrix polymer | Components of the dispersed phase ||||| 
|---|---|---|---|---|---|---|
| | | (a) Rubbery polymer | (b) Crystalline olefin polymer | Derivative of (a) | Derivative of (b) | Inorganic filler |
| 8 | O | | O | O | O | O |
| 9 | O | O | O | O | O | O |
| 10 | O | O | | | | O |
| 11 | O | | | O | | O |
| 12 | O | O | | O | | O |

COMPOSITION OF THE INVENTION

Compositions of types 1, 2 and 3 below are preferred as the compositions of the invention obtained from the aforesaid combinations of components and the aforesaid manufacturing process.

Type 1

A composition in which the dispersed phase consists of (A) a crystalline olefinic polymer which cannot be uniformly mixed with the olefinic polymer forming the matrix, or (B) a composition composed of a reactive derivative of the crystalline olefinic polymer (A) having affinity for both the crystalline olefinic polymer (A) and the inorganic filler, and (C) the inorganic filler filled in (A) or (B), the components (A) or (B) and (C) being surrounded by (D) an impact absorbing monolefinic or diolefinic rubbery polymer.

Type 2

A composition in which the dispersed phase consists of (D) an impact absorbing monolefinic or diolefinic rubbery polymer, or (E) a composition composed of the rubbery polymer (D) and a reactive derivative of the rubbery polymer (D), and (C) the inorganic filler filled in the component (D) or (E).

Type 3

A composition in which the dispersed phase consists of (A) a crystalline olefinic polymer which cannot be uniformly mixed with the olefinic polymer forming the matrix, either (D) an impact absorbing monolefinic or diolefinic rubbery polymer or (E) a composition composed of the rubbery polymer (D) and a reactive derivative of the rubbery polymer (D), component (D) or (E) surrounding component (A), and (C) the inorganic filler filled in component (D) or (E).

Those compositions of types 1, 2 and 3 which at least contain (A) the crystalline olefinic polymer which cannot be uniformly mixed with the olefinic polymer constituting the matrix and (D) the rubbery polymer or copolymer surrounding the polymer (A) in the dispersed phase generally have high impact strength and moderate rigidity. By filling the inorganic filler in the dispersed phase of these compositions, impact strength is markedly increased and rigidity is also increased.

The composition of the invention in which the inorganic filler is filled only in the dispersed phase is preferred because it has increased impact strength. But the composition of the invention which contains the inorganic filler not only in the dispersed phase but also in the matrix phase can also exhibit the advantages of the invention.

The principal cases in Table A above are shown by Examples and drawings (photographs) as follows:

Case 1: Example 9
Case 2: Example 1 (FIG. 7), Examples 11-a and 11-b and Example 13
Case 3: Example 10
Case 4: Example 6 (FIG. 14)
Case 5: Example 2 (FIG. 11), Example 3 (FIG. 13), Example 5, and Example 8
Case 6: Example 7
Case 9: Example 4
Case 11: Example 12-a
Case 12: Example 12-b

BRIEF DESCRIPTION OF THE ACCOMPANYING DRAWINGS

All the drawings attached hereto are scanning electron microphotographs (taken by using a scanning electron microscope made and sold under the tradename HHS-2R by Hitachi Limited). The test specimens were observed after they were pre-treated by the method described in detail hereinabove.

FIG. 1 is a 5,000X photograph which shows the morphology of a composition composed of polypropylene and 20% by weight of calcium carbonate after it was broken by impact (for reference). FIG. 1 shows that by the application of impact, minute cracks occur on the interface between the matrix and the inorganic filler, and the cracks grow and propagate in the matrix, leading to fracture of the material.

FIG. 2 is a 10,000X photograph which clarifies the state of the dispersed phase of an ethylene/propylene copolymer by etching with xylene (for reference). FIG. 2 shows that the dispersed phase dispersed in crystalline polypropylene as a matrix phase assumes a structure of a composite of crystalline polyethylene surrounded by the ethylene/propylene copolymer rubber (seen as the depressed portions dissolved out with xylene).

FIG. 3 is a 2,000X photograph showing the state of cracks which occurred in the ethylene/propylene copolymer shown in FIG. 2 upon application of impact (for reference). FIG. 3 shows that unlike the case of FIG. 1, the formed cracks are confined within the dispersed phase by the effect of the ethylene/propylene copolymer rubber present in the interface between the dispersed phase and the matrix phase.

FIG. 4 is a 4,000X photograph of a composition consisting of the ethylene/propylene block copolymer shown in FIG. 2 and 20% by weight of precipitated calcium carbonate filled therein (for reference). It is seen from FIG. 4 that the inorganic filler in the composition is dispersed only in the polypropylene portion constituting the matrix, and upon the application of impact, fracture occurs mainly at the matrix portion as in the case of FIG. 1.

FIG. 5 is a 5,000× photograph of a composition of the invention obtained by mixing the ethylene/propylene block copolymer shown in FIG. 2 with 20% by weight of precipitated colloidal calcium carbonate having an average particle diameter of 0.3 micron and 10% by weight of high-density polyethylene graft-modified with maleic anhydride. FIG. 5 shows the morphological characteristic that the inorganic filler is present in the dispersed phase contrary to the case of FIG. 4. Upon the application of impact, numerous minute cracks occur around the inorganic filler in the dispersed phase, but growth of these cracks is inhibited by the ethylene/propylene copolymer rubber present around the dispersed phase, with the result that the composition of exhibits a marked increase in impact strength.

FIG. 7 is a 5,000× photograph showing the morphology of the composition of Example 1. The morphology corresponds to case 2 in Table A above, and shows that the inorganic filler is present in polyethylene.

FIGS. 6 and 8 are 5,000× photographs showing the morphological characteristics of the compositions obtained in Comparative Examples I-a and I-b. FIG. 6 shows the structure of an ethylene/propylene block copolymer, and FIG. 8 shows the structure of a composition consisting of the block copolymer of FIG. 6, unmodified polyethylene and calcium carbonate, the calcium carbonate being present only in the matrix.

FIGS. 9 and 10 are a 4,000× photograph and a 5,000× photograph respectively showing the morphologies of the compositions shown in Comparative Example 1-a (FIG. 6) and Example 1 (FIG. 7) after fracture by application of impact. The microcracks formed in the dispersed phase as seen in FIG. 9 are conductive to the exhibition of high impact strength in the ethylene/propylene block copolymer. As seen in FIG. 10, in the composition of Example 1, the microcracks are increased further by numerous minute cracks occurring on the interface of the fine filler. This substantiates that the composition of Example 1 has a great ability to absorb impact energy.

Figure 14:
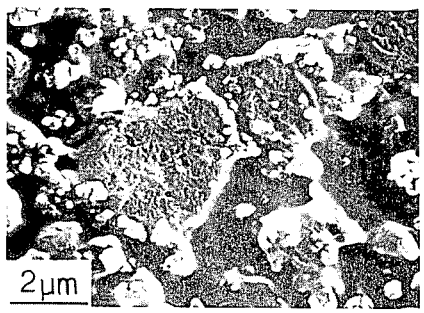
Figure 15:
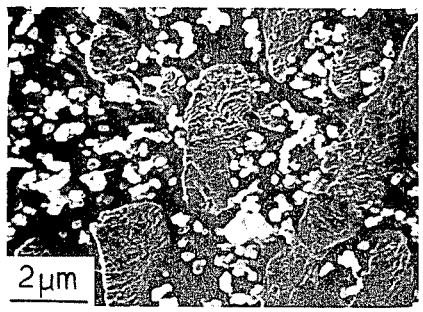

FIGS. 14 and 15 are 6,000× photographs showing the morphologies of the compositions obtained in Example 6 and Comparative Example 6. FIG. 14 corresponds to case 4 in Table A and shows that calcium carbonate as the inorganic filler is present in the maleic anhydride-modified ethylene/propylene copolymer rubber which constitutes the polymer composite as the dispersed phase. On the other hand, FIG. 15 shows that as in ordinary compositions, the inorganic filler is present only in polypropylene as the matrix.

EXAMPLES AND COMPARATIVE EXAMPLES

The following examples illustrate the present invention more specifically.

EXAMPLE 1 AND COMPARATIVE EXAMPLES 1-a and 1-b

Comparative Example 1-a

Twenty grams of finely divided titanium trichloride (TAC-132, a tradename for a product of Toho Titanium Co., Ltd.), 40 g of diethyl aluminum monochloride and 45 liters of n-heptane were charged into a 100-liter autoclave equipped with a stirrer.

Propylene was fed into the autoclave and polymerized at a temperature of 65° C., a maximum pressure of 6 kg/cm$^2$.G and a hydrogen concentration of 3% until a predetermined amount of propylene was supplied.

The unreacted propylene was purged to a pressure of 0.5 kg/cm$^2$.G, and then ethylene was polymerized at a temperature of 65° C., and a maximum pressure of 3 kg/cm$^2$.G until the ethylene content reached about 15% by weight based on the entire polymer. Ten minutes after the starting of ethylene polymerization, the gaseous phase of the autoclave consisted of 75 to 80% of ethylene and 25 to 20% of propylene.

Butanol (3 liters) was added to the resulting polymer slurry to stop the polymerization. The product was subjected to a catalyst decomposing procedure at 70° C. for 2 hours and then centrifuged, washed with water and dried.

The resulting crystalline ethylene/propylene block copolymer powder obtained had an ethylene content of 15% by weight and a melt flow rate (MFR) of 1.0 g/10 minutes.

The resulting copolymer powder was mixed with 0.15 % by weight of 2,6-di-t-butyl-4-methylphenol (stabilizer I) and 0.15% by weight of n-octadecyl β-(4'-hydroxy-3',5'-di-t-butylphenyl)-propionate (stabilizer II) in a supermixer, then kneaded in a twin-screw extruder (made by Ikegai Iron Works, Ltd.), and cooled to form pellets.

Figure 1:
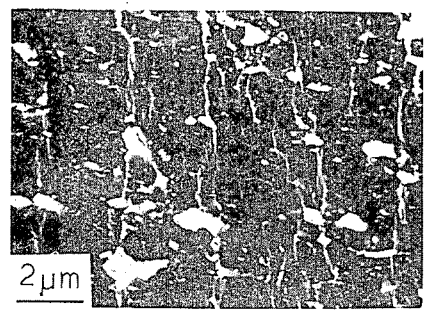
Figure 2:
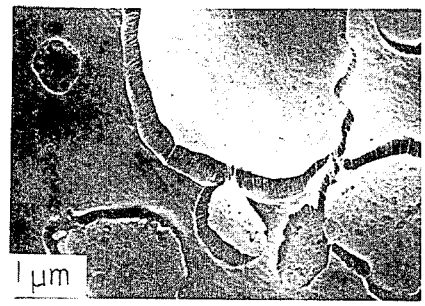
Figure 3:
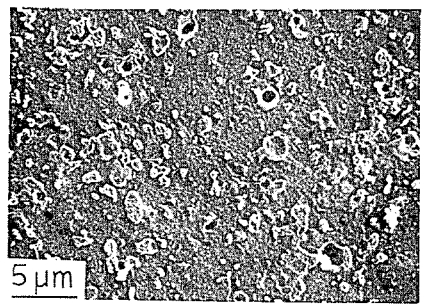
Figure 4:
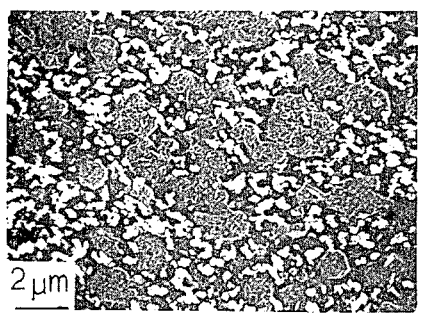
Figure 5:
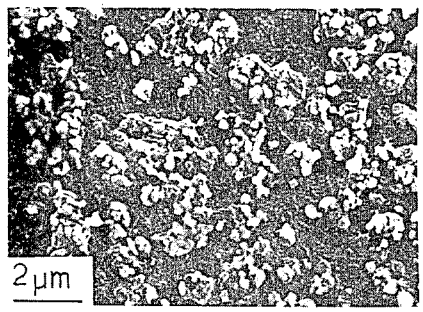
Figure 6:
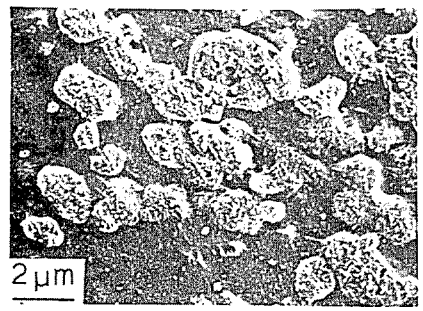

A part of the pellets was pre-treated by the method described in detail hereinabove, and its morphology was observed by a scanning electron microscope. The results are shown in FIG. 6.

The morphological characteristic of the composition obtained in Comparative Example 1-a is that polypropylene formed a matrix phase, and a composite consisting of polyethylene (15% by weight based on the entire composition) and the ethylene/propylene copolymer surrounding the polyethylene formed a dispersed phase. The dispersed phase had a size of 0.5 to 3 microns, and was uniformly distributed in the matrix.

Example 1

Sixty-four parts by weight of the ethylene/propylene block copolymer powder obtained in Comparative Example 1-a, 16 parts of pellets of maleic anhydride-grafted high-density polyethylene containing 1.5% by weight of maleic anhydride (MFR 1.0 g/10 minutes; a product manufactured on a trial basis by Mitsubishi Petrochemical Co., Ltd.), 20 parts by weight of nearly cubic particles of precipitated calcium carbonate having an average particle diameter of 0.2 micron, and stabilizers I and II mentioned above each in an amount of 0.15% by weight, based on the total weight of the ethylene/propylene block copolymer and the maleic anhydride-grafted high-density polyethylene were mixed in a supermixer, kneaded in a twin-screw extruder (made by Ikegai Iron Works, Ltd.), and cooled to form pellets in the same way as in Comparative Example 1-a.

Figure 7:
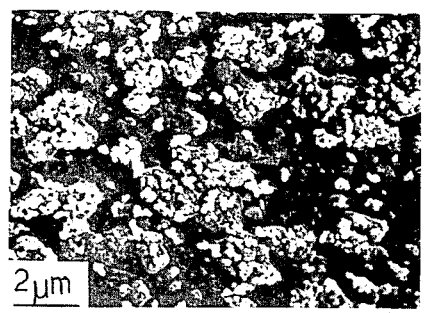

The resulting composition was morphologically examined by a scanning electron microscope, and the results are shown in FIG. 7. FIG. 7 shows the unique morphological characteristic that in the composition of Example 1, the inorganic filler is present in polyethylene (the maleic anhydride-grafted high-density polyethylene was coexistent) which is a part of the dispersed phase.

Comparative Example 1-b

Figure 8:
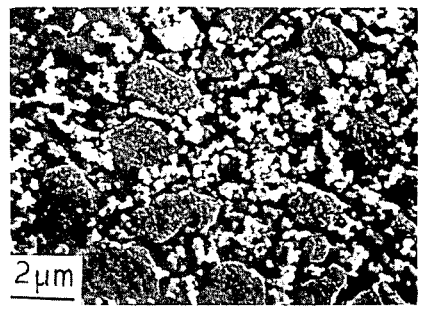

For comparison, the procedure of Example 1 was repeated except that ordinary high-density polyethylene (PY-40, a tradename for a product of Mitsubishi Petrochemical Co., Ltd.; MFR 1.0 g/10 minutes) was used instead of the maleic anhydride-grafted high-density polyethylene. The resulting composition was morphologically examined in the same way as above. The results are shown in FIG. 8 which indicates that the inorganic filler did not exist in the dispersed phase but only in the matrix.

The remainder of each of the pelletized compositions obtained in Example 1 and Comparative Examples 1-a and 1-b was molded by a screw inline injection molding machine (made by Meiki Seisakusho Co., Ltd.) to form test specimens. The Izod impact strengths and three-point flexural moduli of the test specimens were measured, and the results are shown in Table 1. The Izod impact strength was measured in accordance with JIS K-7203 using a notched test specimen at a temperature of 23° C. and −40° C. respectively. The three-point flexural modulus was measured at 23° C. in accordance with JIS K-7203.

The results given in Table 1 demonstrate that the composition of Example 1 having the unique morphology stated above has a much higher impact strength both at 23° C. and −40° C. than the propylene/ethylene block copolymer (Comparative Example 1-a), and that it also has much higher impact strength, especially at −40° C., than the composition of Comparative Example 1-b containing an inorganic filler and having an ordinary morphology.

The markedly high level of impact strength possessed by the composition of Example 1 is also substantiated by the results of observation of the morphology of the test specimen after impact fracture in comparison with the compositions of Comparative Examples 1-a and 1-b.

Figure 9:
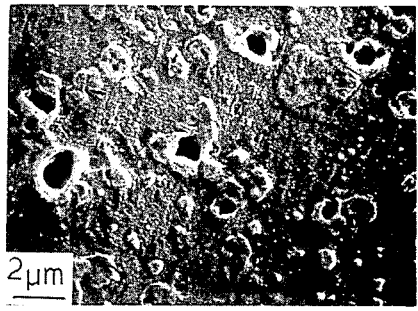

FIG. 9 shows the morphology of the ethylene/propylene block copolymer (Comparative Example 1-a) shown in FIG. 6 after fracture by application of impact. It is seen that relatively large cracks occur in the dispersed phase.

Figure 10:
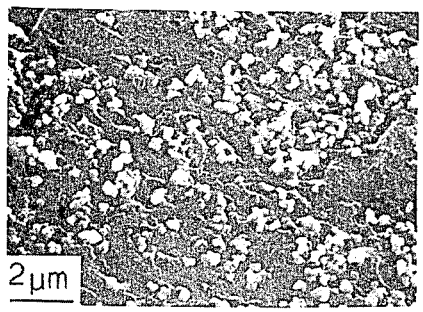

FIG. 10 shows the morphology of the composition of Example 1 shown in FIG. 7 after fracture by application of impact. It is seen that microcracks occur around numerous fine particles of clacium carbonate present in polyethylene constituting the dispersed phase, and therefore, the composition of Example 1 can absorb much impact energy, and further that growth of the microcracks is inhibited by the ethylene/propylene copolymer rubber which is an impact absorbing polymer surrounding the polyethylene constituting the dispersed phase. Thus, the composition of Example 1 has a much greater ability to absorb impact energy than the composition of Comparative Example 1-b having an ordinary morphology (the inorganic filler is present in the matrix) which has no ability to inhibit growth of such microcracks.

TABLE 1

| Run No. | Composition (parts by weight) | Izod impact strength (kg-cm/cm) 23° C. | Izod impact strength (kg-cm/cm) −40° C. | Three-point flexural modulus (kg/cm$^2$) |
| --- | --- | --- | --- | --- |
| Example 1 | Ethylene/propylene block copolymer (64) Maleic anhydride-graftee high-density polyethylene (16) Calcium carbonate (20) | above 50 | 13.0 | 12000 |
| Comparative Example 1-a | Ethylene/propylene block copolymer (100) | 16.0 | 5.0 | 10500 |
| Comparative Example 1-b | Ethylene/propylene block copolymer (64) High-density polyethylene (16) Calcium carbonate (20) | 23.0 | 3.8 | 13500 |

EXAMPLE 2 AND COMPARATIVE EXAMPLE 2

Example 2

Fifty parts by weight of a powder of crystalline polypropylene (TA-5, a trademark for a product of Mitsubishi Petrochemical Co., Ltd.) having an MFR of 4 g/10 minutes and an isotactic index (n-heptane-insoluble content) of 95, 15 parts of pellets of maleic anhydride-grafted high-density polyethylene having a maleic anhydride content of 1.0% by weight (manufactured on a trial basis by Mitsubishi Petrochemical Co., Ltd.), 5 parts by weight of pellets of an ethylene/propylene copolymer rubber (EP-07P, a product of Japan EP Rubber Co., Ltd.) having an ethylene content of 72% by weight and a Mooney viscosity, $ML_{1+4}$ (100° C.), of 70, 30 parts by weight of nearly cubic particles of precipitated calcium carbonate having an average particle size of 0.16 micron and surface-treated with a higher fatty acid, and 0.2% by weight, based on the polypropylene, of n-octadecyl $\beta$-(4'-hydroxy-3',5'-di-t-butylphenyl)propionate were mixed by a supermixer, kneaded by a Brabender plastogram and cooled to form pellets.

Comparative Example 2

For comparison, the procedure of Example 1 was repeated except that the same high-density polyethylene (MFR 1.0 g/10 minutes) as obtained in Comparative Example 1-b was used instead of the maleic anhydride-grafted high-density polyethylene.

Figure 11:
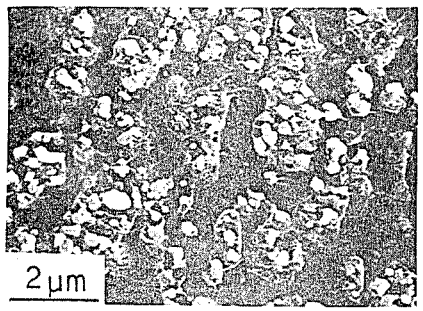
FIG. 11 is a 7,000× photograph showing the morphology of the composition of Example 2. Its morphology corresponds to case 5 in Table A, and shows that the inorganic filler is surrounded by the dispersed phase.
Figure 12:
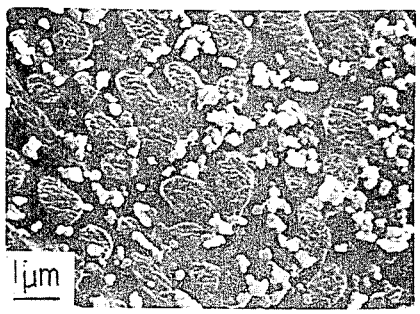
FIG. 12 is a 7,000× photograph showing the morphology of the composition of Comparative Example 2. It is seen that contrary to the case of FIG. 11, the inorganic filler is present only in the matrix.

The pellets obtained in Example 2 and Comparative Example 2 were morphologically examined, and the results are shown in FIGS. 11 and 12. These pellets were molded by a compression molding machine (made by Toyo Seiki Seisakusho Co., Ltd., ), and the Charpy impact strengths and Olsen flexural rigidities (Stiffness by means of a cantilever beam) of the molded test specimens were measured. The results are shown in Table 2. The Charpy impact strength was measured at 23° C. and −40° C. in accordance with JIS K-7111 using a notched test specimen. The Olsen flexural rigidity was measured at 23° C. in accordance with ASTM-D-747, and the measured value at a deformation angle of 10° was adopted.

The morphological characteristic of the composition of Example 2, as shown in FIG. 11, is that the matrix phase consists of polypropylene, and the dispersed phase consisted of a composite composed of maleic anhydride-grafted high-density polyethylene with the inorganic filler existing therein and the ethylene/propylene copolymer rubber surrounding the above modified polyethylene.

The dispersed phase had a size of 0.5 to 3 microns and was uniformly distributed in the matrix.

The morphological characteristic of the composition of Example 2, as is seen from FIG. 12, is that the inorganic filler is dispersed only in the polypropylene matrix phase.

Table 2 demonstrates that the composition of Example 2 having the unique morphology exhibits a superior balance in properties.

TABLE 2

| Run No. | Composition (parts by weight) | Charpy impact strength (kg-cm/cm$^2$) 23° C. | −40° C. | Olsen flexural rigidity (kg/cm$^2$) |
|---|---|---|---|---|
| Example 2 | Polypropylene (50) Maleic anhydride-grafted high-density polyethylene (15) Ethylene/propylene copolymer rubber (5) Calcium carbonate (30) | above 50 | 14.5 | 8900 |
| Comparative Example 2 | Polypropylene (50) High-density polyethylene (15) Ethylene/propylene copolymer rubber (5) Calcium carbonate (30) | 32.0 | 9.5 | 9200 |

EXAMPLE 3

A polymer composition was prepared in the same way as in Example 2 except that vinyltrimethoxysilane-grafted high-density polyethylene having an MFR of 12 g/10 minutes and a vinyltrimethoxysilane content of 1.5% by weight (manufactured on a trial basis of Mitsubishi Petrochemical Co., Ltd.) was used instead of the maleic anhydride-grafted high-density polyethylene, and kaolin clay having an average particle diameter of 1 micron was used instead of the precipitated calcium carbonate.

Figure 13:
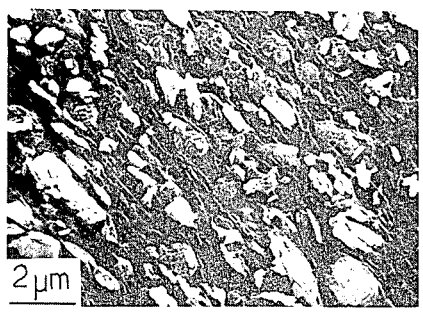
FIG. 13 is a 5,000× photograph (corresponding to case 5 in Table A) showing the morphology of the composition obtained in Example 3. It is seen that kaolin clay is present in the dispersed phase.

The morphology of the resulting composition is shown in FIG. 13. It was ascertained that kaolin clay as the inorganic filler was present in the vinyltrimethoxysilane-grafted polyethylene surrounded by the rubber component. As a result of having such a unique morphology, the composition of Example 3 had a markedly high impact strength especially at low temperatures.

The dispersed phase of this composition had a size of 0.1 to 2 microns and was uniformly distributed in the matrix.

EXAMPLE 4 AND COMPARATIVE EXAMPLE 4

Example 4

Fifty parts by weight of the same ethylene/propylene block copolymer as obtained in Example 1, 20 parts by weight of the same maleic anhydride-grafted high-density polyethylene pellets as used in preparing the composition of Example 1, 10 parts by weight of pellets of a maleic anhydride-grafted ethylene-propylene copolymer rubber having a maleic anhydride content of 1.6% by weight (manufactured on a trail basis by Mitsubishi Petrochemical Co., Ltd.; the ethylene/propylene copolymer used as a base was EP07P of Japan EP Rubber Co., Ltd.), 20 parts by weight of nearly cubic particles of precipitated calcium carbonate having an average particle diameter of 0.2 micron, and 0.2% by weight, based on the total weight of the ethylene/propylene block copolymer, the maleic anhydride-grafted high-density polyethylene and maleic anhydride-grafted ethylene/propylene copolymer rubber, of 2,6-di-t-butyl-4-methylphenol as a stabilizer were kneaded by a Brabender plastogram, and cooled to form a composition.

Comparative Example 4

For comparison, a polymer composition was prepared in the same way as in Example 4 except that the same unmodified high-density polyethylene as used in Comparative Example 1-b was used instead of the maleic anhydride-grafted high-density polyethylene, and the same ethylene/propylene copolymer rubber as used in Example 2 was used instead of the maleic anhydride-grafted ethylene/propylene copolymer rubber.

The composition of Example 4 had the unique morphological characteristic that calcium carbonate as the inorganic filler is present in the dispersed phase of a composite composed of the polyethylene composition (containing polyethylene based on the ethylene/propylene block copolymer and maleic acid-grafted high-density polyethylene) and the ethylene/propylene copolymer composition (containing the ethylene/propylene copolymer rubber based on the ethylene/propylene copolymer and the maleic anhydride-grafted ethylene propylene copolymer) surrounding the polyethylene composition.

In the composition of Comparative Example 4, calcium carbonate was present only in the matrix polypropylene phase as in the composition of Comparative Example 1-b.

Pellets of the compositions of Example 4 and Comparative Example 4 were compression-molded by the same method as in Example 2, and the Charpy impact strengths of the molded articles were measured. The results are shown in Table 3.

As a result of having the above unique morphological, the composition of Example 4 had a much higher impact strength especially at −40° C. than the composition of Comparative Example 4. The dispersed phase of the composition of Example 4 had a size of 0.5 to 3.5 microns and was distributed uniformly in the matrix.

TABLE 3

| Run No. | Composition (parts by weight) | Charpy impact strength (kg-cm/cm$^2$) 23° C. | −40° C. |
|---|---|---|---|
| Example 4 | Ethylene/propylene block copolymer (50) | above 50 | above 50 |

TABLE 3-continued

| Run No. | Composition (parts by weight) | Charpy impact strength (kg-cm/cm²) | |
|---|---|---|---|
| | | 23° C. | −40° C. |
| Comparative Example 4 | Maleic anhydride-grafted polyethylene (20) Maleic anhydride-grafted ethylene/propylene copolymer rubber (10) Calcium carbonate (20) Ethylene/propylene block copolymer (50) High-density polyethylene (20) Ethylene/propylene copolymer rubber (10) Calcium carbonate (20) | 38.0 | 6.8 |

EXAMPLE 5 AND COMPARATIVE EXAMPLE 5

Example 5

A polymer composition prepared in the same way as in Example 4 except that a crystalline ethylene/propylene random copolymer (FX3, a product of Mitsubishi Petrochemical Co., Ltd.) having an MFR of 9 g/10 minutes and an ethylene content of 4% by weight was used instead of the ethylene/propylene block copolymer, and the same ethylene/propylene copolymer rubber as used in the composition of Example 2 was used instead of the maleic anhydride-grafted ethylene/propylene copolymer rubber.

Comparative Example 5

A polymer composition was prepared in the same way as in Example 5 except that the same unmodified high-density polyethylene as in Comparative Example 1-b was used instead of the maleic anhydride-grafted high-density polyethylene.

The composition of Example 5 had the unique morphological characteristic that the inorganic filler was present in the dispersed phase of the maleic anhydride-grafted high-density polyethylene surrounded by the rubbery component. The dispersed phase of the composition of Example 5 had a size of 0.5 to 3 microns, and was uniformly distributed in the matrix. In contrast, the morphology of the composition of Comparative Example 5 was that calcium carbonate as the inorganic filler was dispersed in the crystalline ethylene/propylene random copolymer as the matrix.

The composition of Example 5 had much higher impact strength than the composition of Comparative Example 5.

EXAMPLE 6 AND COMPARATIVE EXAMPLE 6

Example 6

A polymer composition was prepared in the same way as in Example 4 except that the same crystalline polypropylene as used in the composition of Example 2 was used instead of the ethylene/propylene block copolymer and the same unmodified high-denstiy polyethylene as used in Comparative Example 1-b was used instead of the maleic anhydride-grafted high-density polyethylene.

Comparative Example 6

For comparison, the same procedure as in Example 6 was repeated except that the same unmodified ethylene/propylene copolymer rubber as in Example 2 was used instead of the maleic anhydride-grafted ethylene/propylene copolymer rubber.

The results of a morphological study of the pellets of these compositions are shown in FIGS. 14 and 15, respectively. The Charpy impact strengths of these compositions were measured, and the results are shown in Table 4.

The composition of Example 6 had the morphological characteristic that calcium carbonate was dispersed in the ethylene/propylene copolymer rubber constituting the dispersed phase in the form of a composite with polyethylene which it surrounded. It had much higher impact strength than the composition of Comparative Example 6 in which the inorganic filler was present only in the polypropylene matrix.

The dispersed phase of the composition of Example 6 had a size of 0.5 to 3 microns, and was uniformly distributed in the matrix.

TABLE 4

| Run No. | Composition (parts by weight) | Charpy impact strength (kg-cm/cm²) | |
|---|---|---|---|
| | | 23° C. | −40° C. |
| Example 6 | Polypropylene (50) High-density polyethylene (20) Maleic anhydride-grafted ethylene/propylene copolymer rubber (10) Calcium carbonate (20) | above 50 | 12.5 |
| Comparative Example 6 | Polypropylene (50) High-density polyethylene (20) Ethylene/propylene copolymer rubber (10) Calcium carbonate (20) | 28.0 | 6.3 |

EXAMPLE 7 AND COMPARATIVE EXAMPLE 7

Example 7

A polymer composition was prepared in the same way as in Example 4 except that the same crystalline polypropylene as in Example 2 was used instead of the ethylene/propylene block copolymer.

Comparative Example 7

The procedure of Example 7 was repeated except that the same unmodified high-density polyethylene as in Comparative Example 1-b was used instead of the maleic anhydride-grafted high-density polyethylene, and an unmodified ethylene/propylene copolymer rubber (EP02P, a product of Japan EP Rubber Co., Ltd.) having an ethylene content of 76% by weight and a Mooney viscosity, $ML_{1+4}$ (100° C.), of 24 was used instead of the maleic anhydride-grafted ethylene/propylene copolymer rubber.

These compositions in pellets were each compression-molded, and the Charpy impact strengths and Olsen flexural rigidities of the test specimens obtained were measured. The results are shown in Table 5.

The composition of Example 7 had the morphological characteristic that calcium carbonate as the inorganic filler was present in the dispersed phase of a composite composed of the maleic anhydride-grafted high-density polyethylene and the maleic anhydride-grafted ethylene/propylene copolymer rubber. It was found that because of this morphology, the composition of Example 7 had a much higher impact strength, especially at −40° C., than the composition of Comparative Example 7 in which the inorganic filler was present in the polypropylene matrix.

TABLE 5

| Run No. | Composition (parts by weight) | Charpy impact strength (kg-cm/cm$^2$) 23° C. | Charpy impact strength (kg-cm/cm$^2$) −40° C. | Olsen flexural rigidity (kg/cm$^2$) |
|---|---|---|---|---|
| Example 7 | Polypropylene (50) Maleic anhydride-grafted high-density polyethylene (20) Maleic anhydride-grafted ethylene/propylene copolymer rubber (10) Calcium carbonate (20) | above 50 | 18.0 | 8500 |
| Comparative Example 7 | Polypropylene (50) High-density polyethylene (20) Ethylene/propylene copolymer rubber (10) Calcium carbonate (20) | 27.8 | 7.5 | 8700 |

EXAMPLE 8 AND COMPARATIVE EXAMPLE 8

Example 8

A polymer composition in pellets was prepared in the same way as in Example 4 except that the same high-density polyethylene as in Comparative Example 1-b was used instead of the crystalline ethylene/propylene block copolymer, maleic anhydride grafted crystalline polypropylene (a product manufactured on a trial basis by Mitsubishi Petrochemical Co., Ltd.; maleic anhydride content 1.5% by weight, MFR 2.0 g/10 minutes), and the same ethylene/propylene copolymer rubber as in Example 2 was used instead of the maleic anhydride-grafted ethylene/propylene copolymer rubber.

Comparative Example 8

For comparison, the procedure of Example 8 was repeated except that the same crystalline polypropylene as in Example 2 was used instead of the maleic anhydride-grafted polypropylene.

The composition of Example 8 had the morphological characteristic that the inorganic filler was dispersed in the maleic anhydride-grafted polypropylene in the composite as the dispersed phase. As a result, the composition of Example 8 had a much higher Charpy impact strength at −40° C. than the composition of Comparative Example 8 in which the inorganic filler was present in the polyethylene matrix, as shown in Table 6.

TABLE 6

| Run No. | Composition (parts by weight) | Charpy impact strength at −40° C. (kg-cm/cm$^2$) |
|---|---|---|
| Example 8 | High-density polyethylene (50) Maleic anhydride-grafted polypropylene (20) Ethylene/propylene copolymer rubber (10) Calcium carbonate (20) | 43.5 |
| Comparative Example 8 | High-density polyethylene (50) Polypropylene (20) Ethylene/propylene copolymer rubber (10) Calcium carbonate (20) | 12.7 |

EXAMPLE 9 AND COMPARATIVE EXAMPLE 9

Example 9

Fifty-eight parts by weight of pellets of polyethylene (EX-40, a product of Mitsubishi Petrochemical Co., Ltd.) having an MFR of 0.8 g/10 minutes, 25 parts by weight of a powder of crystalline propylene/methylhexadiene random copolymer having a methylhexadiene content of 6% by weight and an MFR of 1.5 g/10 minutes (a product manufactured on a trial basis by Mitsubishi Petrochemical Co., Ltd.), 12 parts by weight of pellets of the same ethylene/propylene copolymer rubber as used in Example 2 (EPO7P), 5 parts by weight of silica having an average particle diameter of 0.03 micron, and 0.15% by weight, based on the total weight of the polyethylene, propylene/methylhexadiene random copolymer and ethylene/propylene copolymer rubber, of n-octadecyl β-(4'-hydroxy-3',5'-di-t-butylphenyl)propionate as a stabilizer were mixed by a supermixer, then kneaded by a Brabender plastogram, and cooled to form pellets.

Comparative Example 9

For comparison, the same procedure as in Example 9 was repeated except that the same vinyltrimethoxysilane-grafted high-density polyethylene as used in the composition of Example 3 was substituted for a portion (18 parts by weight) of the polyethylene pellets, and the same unmodified crystalline polypropylene as in the composition of Example 2 was used instead of the propylene/methylhexadiene random copolymer.

A morphological study of the composition of Example 9 led to the discovery that silica as the inorganic filler was present in the propylene/methylhexadiene random copolymer in the composite as the dispersed phase. Because of this unique morphology, the composition of Example 9 had a much higher Charpy impact strength at −40° C. as shown in Table 7 than the composition of Comparative Example 9 in which silica was present only in the polyethylene matrix.

TABLE 7

| Run No. | Composition (parts by weight) | Charpy impact strength at −40° C. (kg-cm/cm$^2$) |
|---|---|---|
| Example 9 | High-density polyethylene (58) Propylene/methylhexadiene random copolymer (25) Ethylene/propylene copolymer rubber (12) Silica (5) | above 50 |
| Comparative Example 9 | High-density polyethylene (40) Vinyltrimethoxysilane-grafted high-density polyethylene (12) Polypropylene (25) Ethylene/propylene copolymer rubber (12) Silica (5) | 22.7 |

EXAMPLE 10 AND COMPARATIVE EXAMPLES 10-A AND 10-B

Example 10

Sixty-two parts by weight of the same ethylene/propylene copolymer powder as obtained in Example 1, 18 parts by weight of the same pellets of maleic anhydride-grafted ethylene/propylene copolymer rubber as used in the composition of Example 4, 20 parts by weight of nearly cubic particles of precipitated calcium carbonate surface-treated with a higher fatty acid and having an average particle diameter of 0.16 micron, and 0.2% by weight, based on the total weight of the ethylene/propylene block copolymer and the ethylene/propylene copolymer rubber, of 2,6-di-t-butyl-4-methylphenol as a stabilizer were kneaded and cooled in the same way as in Example 2 to form a composition.

Comparative Examples 10-a and 10-b

For comparison, the procedure of Example 10 was repeated except that the same unmodified ethylene/propylene copolymer rubber as in Comparative Example 7 was used instead of the maleic anhydride-grafted ethylene/propylene copolymer rubber [Comparative Example 10-a], or the same maleic anhydride-grafted polypropylene powder as in the composition of Example 8 was used instead of a portion (12 parts by weight) of the ethylene/propylene block copolymer powder in the composition of Comparative Example 10-a [Comparative Example 10-b].

The compositions obtained in Example 10 and Comparative Examples 10-a and 10-b were compression-molded in the same way as in Example 2 to form test specimens. The Charpy impact strengths and Olsen flexural rigidities of the test specimens were measured, and the results are shown in Table 8.

A morphological study of the composition of Example 10 led to the discovery that finely divided calcium carbonate as the inorganic filler was present in polyethylene in the disperse phase consisting of the polyethylene surrounded by the ethylene/propylene copolymer rubber (also containing the maleic anhydride/modified ethylene/propylene copolymer rubber).

As a result of having this unique morphology, the composition of Example 10 had a much higher impact strength than the composition of Comparative Example 10-a in which the inorganic filler was present only in the polypropylene matrix and the composition of Comparative Example 10-b in which the inorganic filler was present in the matrix phase of the composition consisting of polypropylene and the malic anhydride-grafted polypropylene. From the standpoint of a balance between impact strength and rigidity, too, the composition of Example 10 was very superior.

TABLE 8

| Run No. | Composition (parts by weight) | Charpy impact strength (kg-cm/cm²) 23° C. | Charpy impact strength (kg-cm/cm²) −40° C. | Olsen flexural rigidity (kg/cm²) |
| --- | --- | --- | --- | --- |
| Example 10 | Ethylene/propylene block copolymer (62) Maleic anhydride-grafted styrene/propylene copolymer rubber (18) Calcium carbonate (20) | above 50 | 21.0 | 7700 |
| Comparative Example 10-a | Ethylene/propylene block copolymer (62) Ethylene/propylene copolymer rubber (18) Calcium carbonate (20) | 22.5 | 8.0 | 8200 |
| Comparative Example 10-b | Ethylene/propylene block copolymer (50) Maleic anhydride-grafted polypropylene (12) Ethylene/propylene copolymer rubber (18) Calcium carbonate (20) | 20.1 | 6.8 | 8000 |

EXAMPLES 11-A AND 11-B AND COMPARATIVE EXAMPLE 11

Examples 11-a and 11-b

A polymer composition was prepared in the same way as in Example 10 except that the same maleic anhydride-grafted high-density polyethylene as in Example 1 was used instead of the maleic anhydride-grafted ethylene/propylene copolymer rubber, and nearly cubic particles of precipitated calcium carbonate having a particle diameter of 0.3 micron (Example 11-a) or particles of calcium carbonate having an average particle diameter of 3 microns produced by pulverization and classification (Example 11-b) were used instead of the precipitated calcium carbonate having an average particle diameter of 0.16 micron.

Comparative Example 11

For comparison, the procedure of Example 11-b was repeated except that the same unmodified high-density polyethylene as in Comparative Example 1-b was used instead of the maleic anhydride-grafted high-density polyethylene.

The Charpy impact strengths of these compositions were measured, and the results are shown in Table 9.

It was found that in the compositions of Examples 11-a and 11-b, calcium carbonate as the inorganic filler was present in polyethylene (coexistent with the maleic anhydride-grafted modified polyethylene) constituting the composite as the dispersed phase. The compositions of Examples 11-a and 11-b having this unique morphology had higher impact strengths than the composition of Comparative Example 11, and this effect was especially great when the average particle diameter of the inorganic filler was not more than 1 micron, particularly about 0.3 micron.

The present inventors believe that this is due to the mechanism of the present invention described in detail above in the specification and the unique fracture behavior analyzed in Example 1.

TABLE 9

| Run No. | Composition (parts by weight) | Charpy impact strength (kg-cm/cm²) 23° C. | −40° C. |
|---|---|---|---|
| Example 11-a | Ethylene/propylene block copolymer (62) Maleic anhydride-grafted high-density polyethylene (18) Calcium carbonate having an average particle diameter of 0.3 micron (20) | above 50 | 16.2 |
| Example 11-b | Ethylene/propylene block copolymer (62) Maleic anhydride-grafted high-density polyethylene (18) Calcium carbonate having an average particle diameter of 3 microns (20) | 35.5 | 10.5 |
| Comparative Example 11 | Ethylene/propylene block copolymer (62) High-density polyethylene (18) Calcium carbonate having an average particle diameter of 3 microns (20) | 12.0 | 6.5 |

EXAMPLES 12-A AND 12-B AND COMPARATIVE EXAMPLE 12

Examples 12-a and 12-b

A polymer composition was prepared in the same way as in Example 10 except that instead of the crystalline ethylene/propylene block copolymer, the same polypropylene as in Example 2 was used (Example 12-a), or a portion (9 parts by weight) of the maleic anhydride-grafted ethylene/propylene copolymer in the composition of Example 12-a was replaced by an unmodified ethylene/propylene copolymer rubber (Example 12-b).

Comparative Example 12

For comparison, a polymer composition was prepared in the same way as in the production of the composition of Example 12-b except that an unmodified ethylene/propylene copolymer rubber was used instead of the maleic anhydride-grafted ethylene/propylene copolymer rubber.

The compositions of Examples 12-a and 12-b were found to have the morphological characteristic that the maleic anhydride-modified ethylene/propylene copolymer rubber (the unmodified ethylene/propylene copolymer rubber was coexistent in the case of the composition of Example 12-b) was dispersed in the matrix of polypropylene, and the inorganic filler was present in the dispersed phase.

As can be seen from Table 10, the compositions of Examples 12-a and 12-b had much higher impact strengths than the composition of Comparative Example 12 in which the inorganic filler was present only in the matrix.

TABLE 10

| Run No. | Composition (parts by weight) | Charpy impact strength (kg-cm/cm²) 23° C. | −40° C. |
|---|---|---|---|
| Example 12-a | Polypropylene (62) Maleic anhydride-grafted ethylene/propylene copolymer rubber (18) Calcium carbonate (20) | above 50 | 12.0 |
| Example 12-b | Polypropylene (62) Maleic anhydride-grafted ethylene/propylene copolymer rubber (9) Ethylene/propylene copolymer rubber (9) Calcium carbonate (20) | above 50 | 11.0 |
| Comparative Example 12 | Polypropylene (62) Ethylene/propylene copolymer rubber (18) Calcium carbonate (20) | 21.0 | 6.5 |

EXAMPLES 13-A, 13-B, 13-C AND 13-D

Polymer compositions were prepared in the same way as in Example 10 except that the same maleic anhydride-grafted high-density polyethylene as in Example 1 was used instead of the maleic anhydride-grafted ethylene/propylene copolymer rubber, and instead of the precipitated calcium carbonate having a particle diameter of 0.16, titanium dioxide having an average particle diameter of 0.2 micron (Example 13-a), magnesium hydroxide having an average particle diameter of 0.5 micron (Example 13-b), calcium silicate having an average particle diameter of 0.5 micron (Example 13-c) and zinc oxide having an average particle diameter of 0.3 micron (Example 13-d) were respectively used.

In any of the compositions obtained, the inorganic filler was present in polyethylene (maleic anhydride-grafted polyethylene was also present) constituting the composite as the dispersed phase. Because of this morphology, these compositions have very high impact strength and a superior balance in properties.

What we claim is:

1. A high impact olefinic polymer composition comprising
   (1) a continuous matrix of a crystalline olefinic polymer which is selected from a crystalline homopolymer of ethylene or propylene, and a crystalline copolymer consisting essentially of a major proportion of at least one monomer selected from the group consisting of ethylene and propylene with a minor proportion of another ethylenically unsaturated monomer,
   (2) a dispersed phase of an impact absorbing rubbery polymer component or its composite dispersed in the matrix,
   (3) a finely divided inorganic filler having a particle diameter less than 2 microns and smaller than that of the dispersed phase, said inorganic filler being filled substantially entirely in said dispersed phase,
   (4) said dispersed phase being selected from the group of the following types I–IV:
   I. a dispersed phase consisting of
   (A') a reactive derivative of a crystalline olefinic polymer which cannot be uniformly mixed with the olefinic polymer forming the matrix, or
   (B) a composition composed of a crystalline olefinic polymer (A) and the reactive derivative of the crystalline olefinic polymer (A'),
   said (A') or (B) being surrounded by
   (C) an impact absorbing rubbery polymer, and said inorganic filler (3) being filled in said (A) or (B);
   II. a dispersed phase consisting of (C') a reactive derivative of an impact absorbing rubbery polymer (C), or (D) a composition composed of the rubbery polymer (C) and the reactive derivative of the rubbery polymer (C'), and said inorganic filler (3) being filled in the component (C') or (D), III. a dispersed phase consisting of (A) a crystalline olefinic polymer which cannot be uniformly mixed with the olefinic polymer forming the matrix, said (A) being surrounded by either (C') a reactive derivative of an impact absorbing rubbery polymer or (D) a composition composed of the rubbery polymer (C) and the reactive derivative of the rubbery polymer (C'), and said inorganic filler (3) being filled in said component (C') or (D), and IV. a dispersed phase consisting of (A') a reactive derivative of a crystalline olefinic polymer which cannot be uniformly mixed with olefinic polymer forming the matrix, or (B) a composition composed of a crystalline olefinic polymer (A) and the reactive derivative of the crystalline olefinic polymer (A'), said (A') or (B) being surrounded by either (C') a reactive derivative of an impact absorbing rubbery polymer, or (D) a composition composed of the rubbery polymer (C) and the reactive derivative of the rubbery polymer (C') and said inorganic filler (3) being filled in both (A') or (B) and (C') or (D), and (5) said impact absorbing rubbery polymer (C) being an ethylene/propylene copolymer rubber, an ethylene/propylene/nonconjugated diene terpolymer, an ethylene/butene copolymer rubber, a styrene/conjugated diene copolymer, or a polydiolefin, and (6) said reactive derivative of an impact absorbing rubbery polymer having hydrophillic groups introduced in the impact absorbing rubbery polymer, and (7) said reactive derivative of a crystalline olefinic polymer having hydrophillic groups introduced in the crystalline olefinic polymer which cannot be uniformly mixed with the crystalline olefinic polymer forming the matrix.

2. The composition of claim 1 wherein the inorganic filler is a finely divided inorganic solid material having an average particle diameter of not more than 1.5 microns.

3. The composition of claim 1 wherein the inorganic filler is a finely divided inorganic solid material having an average particle diameter of not more than 1 micron.

4. The composition of claims 2 or 3 wherein the inorganic filler, either by itself or as a result of being treated or coated with another component, has greater affinity for at least one polymer component in the impact absorbing polymer or its composite constituting the dispersed phase than for the thermoplastic olefinic polymer constituting the matrix.

5. The composition of claim 1 wherein the dispersed phase consists of (A) a crystalline olefinic polymer which cannot be uniformly mixed with the olefinic polymer constituting the matrix, or (B) a composition composed of a reactive derivative of the crystalline olefinic polymer (A) having affinity for both the crystalline olefinic polymer (A) and the inorganic filler, and (C) the inorganic filler filled in (A) or (B), the components (A) or (B) and (C) being surrounded by (D) an impact absorbing monolefinic or diolefinic rubbery polymer.

6. The composition of claim 1 wherein the dispersed phase consists of (D) an impact absorbing monolefinic or diolefinic rubbery polymer, or (E) a composition composed of the rubbery polymer (D) and a reactive derivative of the rubbery polymer (D), and (C) the inorganic filler filled in the component (D) or (E).

7. The composition of claim 1 wherein the dispersed phase consists of (A) a crystalline olefinic polymer which cannot be uniformly mixed with the olefinic polymer constituting the matrix, either (D) an impact absorbing monolefinic or diolefinic rubbery polymer or (E) a composition composed of the rubbery polymer (D) and a reactive derivative of the rubbery polymer (D), component (D) or (E) surrounding component (A), and (C) the inorganic filler filled in the component (D) or (E).

8. The composition of claim 1 wherein the amount of the inorganic filler is 1 to 60% by weight based on the entire composition.

9. The composition of claim 1 wherein the amount of the inorganic filler is 3 to 45% by weight based on the entire composition.

10. The composition of claim 1 wherein the amount of the thermoplastic olefinic polymer constituting the matrix is 30 to 98.5% by weight based on the entire composition.

11. The composition of claim 1 wherein the amount of the polymer component (the dispersed phase excluding the inorganic filler) forming the dispersed phase is 0.5 to 69% by weight, preferably 10 to 40% by weight, based on the entire composition.

* * * * *